March 10, 1936.  A. E. CARLISS  2,033,512
TIRE VALVE
Filed May 16, 1930
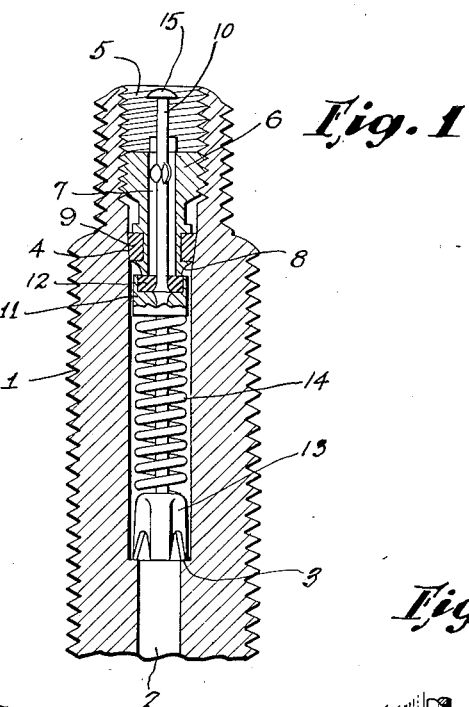
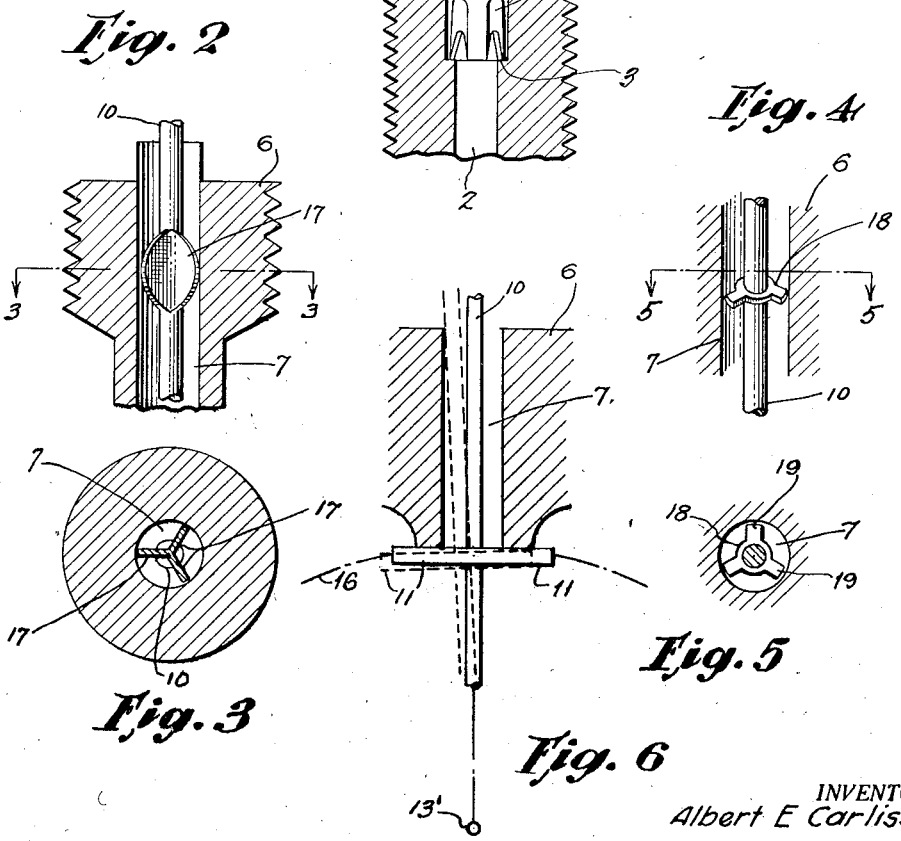
INVENTOR.
Albert E Carliss
BY James L. Stewart
ATTORNEY.

Patented Mar. 10, 1936

2,033,512

UNITED STATES PATENT OFFICE 2,033,512

TIRE VALVE

Albert E. Carliss, Floral Park, N. Y., assignor to Acme Air Appliance Company, Inc., Brooklyn, N. Y., a corporation of New York Application May 16, 1930, Serial No. 452,834

2 Claims. (Cl. 152—12)

This invention relates to valves for use in the tire nipples of pneumatic tires.

The most common type of valve for this purpose embodies a valve seat member in the form of a plug threaded to screw into the passage of the nipple. This plug has a coaxial air passage terminating at its inner end in a cross axial seat. The sealing element of the valve is mounted intermediate the ends of the valve stem which extends outwardly from the sealing element through the said air passage and also inwardly from the sealing element to an appropriate guide adapted for engagement with an abutment in the nipple.

Inasmuch as the air to be introduced into the tire must pass through the axial passage of the plug and about the valve stem which projects therethrough, valve stems of this type are made in the form of a relatively light pin which leaves considerable clearance between the pin and the wall of the axial passage of the plug. The inner end of the valve stem is mounted in an appropriate guide as stated, but because of the clearance to which I have referred, there is no adequate means for guiding the outer end of the stem, i. e., that portion of the stem which extends through the passage of the plug and there results an ever-present tendency on the part of the valve stem to tilt or cant. The structure is such that an effectual sealing cooperation cannot occur between the sealing member and its seat unless the stem is substantially coaxial with the plug and it therefore follows that if the stem tilts or cants as stated, a leaky condition results.

The foregoing disadvantages of valves of the character described have long been recognized as they are practically universal in valves of this kind.

So far as I am aware only one expedient has been suggested to overcome the disadvantages to which I have referred. According to this expedient, the plug of the valve was formed without a valve seat, the valve seat being provided on a separate part which was mounted on the plug for swivel movement relative thereto. On the outer end of the plug was formed an extension termed a screw driver projection which extended completely across the plug. The center of this extension was perforated to form a valve stem guide and said projection was undercut at its center to open communication with the air passage through the plug. Such structure would manifestly centralize the outer end of the stem and preclude the stem from tilting. Nevertheless the arrangement stated resulted in the addition of separate movable parts of minute size which materially added to the cost of manufacture in an article which must necessarily be sold at a relatively low cost to the ultimate purchaser. For these reasons and others which were recognized by the trade in general, the said valve has not met with favor.

The object of the present invention is to provide a construction which will overcome the disadvantages to which I have referred and the manufacture of which construction will not materially increase manufacturing costs. As a matter of fact, in the preferred practical form of this invention, the problem of valve tilting is solved without appreciable, if any, added cost. Furthermore, the present invention contemplates the centralizing of the valve stem with reference to the plug passage through which it extends by means positioned within said passage and carried by the valve stem itself without restricting the capacity of the passage to pass air and without necessitating in the manufacture of the invention the manipulation of minute parts or the practising of expensive operations.

Thus, in its preferred practical form, the invention consists in swedging that portion of the valve stem which extends through the plug passage to form directly upon the valve stem radially extending fingers, preferably three in number and in trefoil relation to serve as a centralizing device in order that the valve stem may be maintained at all times coaxial with the passage. While this is the preferred form of the invention, I may accomplish a similar result by mounting a spacing member upon the stem within said passage without departing from this invention, which consists, generally speaking, in positioning the spacing or centralizing means within and intermediate the ends of the air passage of the valve plug.

An important feature of the present invention resides in the fact that when the centralizing means is associated with the valve stem within the passage of the plug as stated, said means serves as a support for the valve stem adjacent the free end of the latter and thus minimizes the tendency of the valve stem to be bent or distorted when said stem is manipulated manually, to admit or lease air from the tire. This is an important feature of the invention, for, as is well known, tire valve stems are relatively light and fragile and unless supported as stated, there is a pronounced tendency to bend the stem when manipulating it to admit or release air. When such a stem is bent, the valve cannot properly seat and leakage results necessitating the installation of new valve mechanism.

Features of the invention, other than those adverted to, will be apparent from the hereinafter detailed description and claims, when read in conjunction with the accompanying drawing.

The accompanying drawing illustrates different practical embodiments of the invention, but the constructions therein shown are to be understood as illustrative, only, and not as defining the limits of the invention.

Figure 1 is a central section of a valve nipple having associated therewith valve mechanism embodying the present invention, portions of which are shown in section and other portions in elevation.

Figure 2 is an enlarged, central section of the valve plug or seat member within the passage of which is a valve stem embodying the present invention.

Figure 3 is a section on the line 3—3 of Figure 2.

Figure 4 is a view similar to Figure 2, but illustrating, in perspective, a modified form of the invention.

Figure 5 is a section on the line 5—5 of Figure 4.

Figure 6 is a diagrammatic view showing the manner in which tilting or canting of the sealing member of the valve results in leakage.

Referring to the drawing, 1 designates a tire nipple of conventional form provided therein with an air passage 2. Within the air passage 2 is formed an offset or abutment 3 and adjacent the free end of the nipple, the passage is tapered or conical as shown at 4. Between the conical part 4 and the free end of the nipple, said nipple is internally threaded as indicated at 5.

The tire nipple illustrated in the drawing is conventional and while the invention may be associated with tire valves of different construction without departing from my generic conception, I have chosen to illustrate the same as associated with a valve of the Schrader type. This valve embodies the usual screw plug 6 provided with an axial passage 7 through which air is adapted to be introduced into or released from the tire. The lower end of the plug 6 terminates in a valve seat 8 and directly above this seat a rubber gasket 9 serves to form an air tight seal with the tapered wall 4. The valve stem is in the form of a pin or light wire rod 10 which carries substantially midway of its ends the sealing member 11 of the valve. This sealing member is rigid on the valve stem and the upper end of said member is cupped to receive a rubber gasket 12 adapted to cooperate with the seat 8 of the plug. The stem projects downwardly from the sealing member and mounted on its lower end is a spring retainer and guide 13 adapted to engage with and rest upon the abutment 3. A spring 14, normally under tension, is interposed between the guide 13 and the sealing member 11 and serves to keep the sealing member seated. The valve stem projects well above the plug 6 and is provided with a suitable head 15. All of the parts which I have described are old and well known and constitute a conventional form of tire valve.

In a valve construction of the type described, it will be noted that there must be sufficient space or clearance left between the stem 10 and the wall of the passage 7 to permit of the passage of appreciable quantities of air therethrough and there must also be an appreciable clearance or space between the periphery of the sealing member 11 and the wall of the air passage 2 of the tire nipple for the same purpose. Consequently, there results an appreciable amount of lateral lost motion of the sealing element and its stem within the passages in which they are respectively positioned. As the stem is guided at its bottom in the spring retainer or guide 13, the lowermost end of the valve stem is secured against lateral shifting, but there is ordinarily no means provided to secure the upper portion of the valve stem against such movement. There consequently results a tendency of the valve stem to tilt or cant about a center designated in Figure 6 as 13' and corresponding to the anchorage afforded by the spring retainer and guide 13. Figure 6 graphically illustrates this operation and this result.

From this showing, it will be noted that inasmuch as the sealing element is rigid with the valve stem, said sealing element can only properly cooperate with its seat to form an air-tight joint when the valve stem is coaxial with the air passage 7. If the valve stem tilts or cants, the sealing element 11 will describe an arc indicated by the line 16. The center of this arc is of course the center 13' and as a result of this tilting or canting, the sealing element will be moved from its normal full line position of Figure 6 to the dotted line position thereof. As a result, the sealing element will be tilted with respect to the valve seat, i. e., it will not uniformly contact with said seat throughout and consequently leakage will result. This condition of affairs frequently occurs in tire valves of the kind under consideration and is obviously a pronounced disadvantage. A similar condition of things results if, for one reason or another, the valve stem becomes bent. When the stem is bent, the sealing element necessarily becomes tilted and cannot properly seat, so that leakage will also result from this course. It therefore becomes not only desirable, but necessary for the proper functioning of the parts to insure coaxial relation at all times between the valve stem and the passage 7 and also to so support and retain the valve stem as to preclude inadvertent bending or distortion thereof. The present invention provides a simple and effectual means to these ends.

In the preferred embodiment of this invention, I swedge or otherwise manipulate that portion of the valve stem which extends through the air passage 7, so as to form from the material of the valve stem, a plurality of radially extending fins shown best in Figures 2 and 3 and designated by the reference character 17. Any number of these fins may be employed without departing from this invention, but three have been found to give the best result, both from a manufacturing standpoint and from a standpoint of efficient operation. Three fins may be readily stamped or swedged from the valve stem by automatic machinery and when equally spaced about the valve stem, will serve to centralize the same with the greatest efficiency. These fins are of course swedged outwardly to such extent as to substantially engage with the wall of the passage 7, as shown in Figure 3 and are so disposed with relation to the length of the stem that they will normally be positioned adjacent the upper end of the passage, but wholly interiorly thereof, so as not to project above the top of the plug 6.

When the upper portion of the valve stem is provided with the centralizing fins as stated, and the lower end of the valve stem is guided by the spring retainer and guide 13, the stem will be supported at both ends and thus will be retained in coaxial relation to the air passage through which it extends. This type of support will, moreover, minimize the possibility of the bending of the valve stem and it will be maintained at all times coaxially of the nipple and in straight operative condition, being free for longitudinal shifting to permit inflation or deflation of the associated tire.

As the sealing member is rigid with the valve stem, its sealing face is maintained at all times in parallel relation to the plane of the seat so that tilting or canting of the sealing element with respect to its seat cannot occur.

I wish to call particular attention to the economies in manufacture of the structure which I have shown in Figs. 2 and 3. The operation necessary for the formation of the fins 17 is of the simplest type and the cost thereof is negligible.

Figures 4 and 5 show a modified form of the invention. According to these views, a spider 18 having three radial arms 19 corresponding to the fins 17 is positioned on the valve stem 10 within the passage 7. This spider serves as a spacer and maintains the valve stem at all times in coaxial relation with the passage 7.

The foregoing detailed description sets forth the invention in its preferred practical form, but the invention is to be understood as fully commensurate with the appended claims.

Having thus fully described the invention, what I claim as new and desire to secure by Letters Patent is:

1. In an assembly of the character described, a tire nipple, a seat member within the nipple and near the outer end thereof, said member having an axial passage with a seat at its inner end, a valve stem extending from substantially the outer end of the nipple inwardly through said passage to a distant point beyond said seat and there pivotally anchored in the axis of the nipple, means carried by the stem within said passage to centralize the stem within the passage, said means cooperating with the anchorage at the inner end of the stem to maintain the stem at all times in coaxial relation with the nipple, a sealing member mounted on the stem intermediate the ends thereof in proximity with the seat and adapted to coact therewith, and an enlargement on the outer end of the stem to limit the distance to which the sealing member may be retracted from the seat.

2. In an assembly of the character described, a tire nipple, a seat member within the nipple and near the outer end thereof, said member having an axial passage with a seat at its inner end, a valve stem extending from substantially the outer end of the nipple inwardly through said passage to a distant point beyond said seat and there pivotally anchored in the axis of the nipple, a sealing member mounted on the stem intermediate the ends thereof in proximity with the seat and adapted to coact therewith, an enlargement on the outer end of the stem to limit the distance to which the sealing member may be retracted from its seat, and a plurality of fins swedged from the stem between the said sealing member and the enlargement and within said passage, said fins extending radially into contact with the wall of the passage to centralize the stem within said passage, whereby the sealing member is maintained coaxial of its seat by the conjoint operation of the axial anchorage at the inner end of the stem and the fins within said passage.

ALBERT E. CARLISS.